(12) United States Patent
Khovaylo et al.

(10) Patent No.: US 6,947,185 B2
(45) Date of Patent: Sep. 20, 2005

(54) SCANNER HAVING A DOCUMENT COVER WITH A FLAP DOOR HINGED THERETO

(75) Inventors: Modest Khovaylo, Fort Collins, CO (US); Steven Vordenberg, New York, NY (US); Philipp Refior, Brooklyn, NY (US); Clay Burns, New York, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 09/935,113

(22) Filed: Aug. 22, 2001

(65) Prior Publication Data

US 2003/0038987 A1 Feb. 27, 2003

(51) Int. Cl.⁷ ............................ H04N 1/04; G03B 27/62
(52) U.S. Cl. ...................... 358/474; 358/487; 358/493; 358/486; 358/496; 358/497; 355/75
(58) Field of Search ................................ 358/474, 487, 358/493, 486, 496, 497, 498; 355/75

(56) References Cited

U.S. PATENT DOCUMENTS

| | | | | |
|---|---|---|---|---|
| 3,944,364 A | * | 3/1976 | Petrini et al. ................. | 355/74 |
| 4,248,530 A | * | 2/1981 | Bockemuhl-Simon et al. ... | 355/74 |
| 5,574,542 A | * | 11/1996 | Brook, III .................... | 399/380 |
| 5,673,105 A | * | 9/1997 | Brook, III .................... | 355/75 |
| 6,233,064 B1 | | 5/2001 | Griffin | |

FOREIGN PATENT DOCUMENTS

| | | |
|---|---|---|
| JP | 7219073 | 8/1995 |
| JP | 2000209409 | 7/2000 |
| JP | 2001053918 | 2/2001 |

OTHER PUBLICATIONS

Foreign Search Report dated Jan. 14, 2003.
Foreign Search Report dated Feb. 3, 2003.

* cited by examiner

*Primary Examiner*—Edward Coles
*Assistant Examiner*—Houshang Safaipour

(57) ABSTRACT

A scanner has a platen supported by a housing. The platen is adapted to abut a media to be scanned. A document cover is adapted to sandwich the media against the platen. The document cover is hinged to the housing by at least one first hinge. The document cover has a base portion having a closed position and at lest one open position, and a flap portion independently hinged to the base portion by at least one second hinge. The flap portion is adapted to open to enable insertion of the media onto the platen while the base portion is in the closed position.

21 Claims, 3 Drawing Sheets

SCANNER HAVING A DOCUMENT COVER WITH A FLAP DOOR HINGED THERETO

BACKGROUND

Scanners are generally handheld, sheet-fed or flatbed. Handheld scanners are held by a user and passed over a document or photograph to digitally scan its image. The image quality of a scan performed with a handheld scanner is largely dependent on the steadiness and alignment of the scan pass. Sheet-fed scanners are generally integrated into another device, such as a fax machine; scanning for output to a personal computer or similar device is a secondary function. The quality of images associated with a sheet-fed scanner is largely dependent on the ability of the feed mechanism to handle the article being scanned.

As relatively high resolution flatbed scanners have grown in popularity, handheld scanners have become largely obsolete, while sheet-fed scanners are relegated to the aforementioned secondary role. Flatbed scanners are configured similar to a copier. A document cover lid is opened, the item or media to be scanned is placed face down on a platen or document glass, and a mechanism disposed beneath the glass is activated to scan a digital image of the media. Typically the document cover is closed over the document or photo to hold the media in place and to shut out ambient light. Use of a flatbed scanner is generally not intuitive. Alignment and proper positioning of a photograph, document or other media to be scanned may be problematic to the computer neophile.

Necessarily, a flatbed scanner has a large "footprint" as it must accommodate a document or similar media laid flat. Although smaller flatbed scanners have been introduced, these scanners are generally sized to accept four inch by six inch, or smaller, photographs or similar media. This smaller type of scanner is particularly well suited for sending or sharing photographs with friends and family, via email. Therefore, these small format scanners are generally intended for non-computer users and are often adapted to facilitate attachment of a scanned image to an email using a television set top box such as a WebTV® device. These small format scanners generally use contact image sensor (CIS) technology.

Computer software, email and Internet traffic have become image intensive. Therefore, the use of scanners has become more prevalent. As broader use of scanner technology has developed, several barriers have arisen.

SUMMARY OF THE INVENTION

A scanner has a platen supported by a housing. The platen is adapted to abut an item, or media, to be scanned. A document cover is adapted to sandwich the media against the platen. The document cover is hinged to the housing by at least one first hinge. The document cover has a base portion having a closed position and at lest one open position, and a flap portion independently hinged to the base portion by at least one second hinge. The flap portion is adapted to open to enable insertion of the media onto the platen while the base portion is in the closed position.

DETAILED DESCRIPTION

Figure 1:
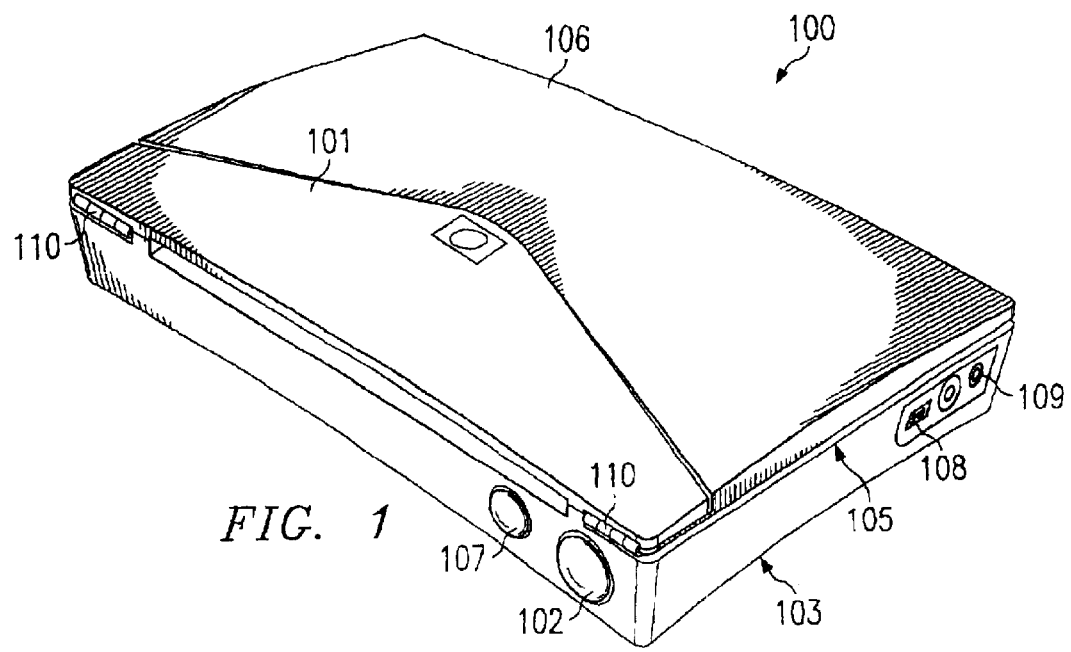
FIG. 1 is a perspective view of a preferred embodiment of a scanner according to the present invention.

Turning now to the FIGURES, the present invention is directed to flatbed envelope scanner 100 particularly well adapted for sharing photographs with family and friends by nontechnical, casual users. Scanner 100 provides a comfortable, intuitive interface familiar from everyday experience, namely an envelope. To communicate the functionality of sharing photographs or other type of media by electronically mailing them to someone else, present scanner 100 (hereafter referred to as "envelope scanner 100") takes the form of the back of an envelope. Envelope scanner 100 eases use and alignment issues present with existing scanners by providing intuitive guidance for its functional use, which is easily recognizable by the casual, nontechnical user. Hence, one opens flap 101 of envelope scanner 100 and inserts a letter, a photograph or similar planar media into slot 501 of envelope scanner 100, and closes flap 101 of envelope scanner 100. The user then presses send button 102 to send an electronic image of the media as an attachment to email to another party or parties.

As will be appreciated by one skilled in the art, the improvements for a scanner disclosed herein may be advantageously incorporated into an oversized scanner or a conventional size scanner, as well as the aforementioned smaller footprint scanner useful for scanning photographs or similar smaller media. The present invention provides a convenient way to insert media for scanning, without limiting versatility of a scanner embodying the present invention. A scanner embodying the present invention may still scan in a conventional manner employing document cover 105 or with document cover 105 removed. A conventional size scanner embodying the present invention may receive conventional size media, such as letter, legal or A4 size documents, into slot 501 as well as smaller media such as photographs. A smaller photo oriented scanner embodying the present invention may receive photos or smaller media through slot 501 for scanning.

As shown in FIGS. 1 through 4, envelope scanner 100 preferably takes an envelope form in size and appearance. Envelope scanner 100 is preferably a small, thin flatbed scanner having a generally parallelepiped housing 103. The housing is adapted to rest on a supporting surface such as a tabletop, desktop, other furniture, cabinet, countertop, floor, etcetera. The housing is further adapted to support a document glass or platen 201. Platen 201 is supported by the generally planar upper side 202 of housing 103. Platen 201 is adapted to abut, face down, a photograph or similar media such as, but not limited to a sheet of paper, document, letter, other writing, clipping, drawing, planar artwork, or the like. Preferably the user employs send button 102 to initiate operation of a contact image sensor (CIS) or other scanning mechanism, operatively disposed within the housing. The CIS moves under the glass and digitally scans an electronic image of the media placed on the platen. A preferred embodiment of the envelope scanner has a generally low profile facilitated by the use of CIS technology.

With attention directed to FIGS. 2 and 4 through 6, preferably, document cover 105 is hinged to housing 103 to cover platen 201 during scanning operations and provide a minimum footprint when not in use. Preferred document cover 105 comprises two portions, a generally rectangular cover base 106 hinged, via one or more hinges 602, to scanner housing 103 and a triangular envelope flap 101. Preferably, envelope flap 101 is hinged to cover base 106 via one or more hinges 110. As detailed below, flap 101 is useful for scanning photographs or other planar media. For other types of media such as magazines, books, oversized documents or oversize photographs, entire document cover 105 hinges and lays flat relative to platen 201. Alternatively, entire document cover 105 may be removed to facilitate scanning of large and/or irregularly shaped items.

Figure 4:
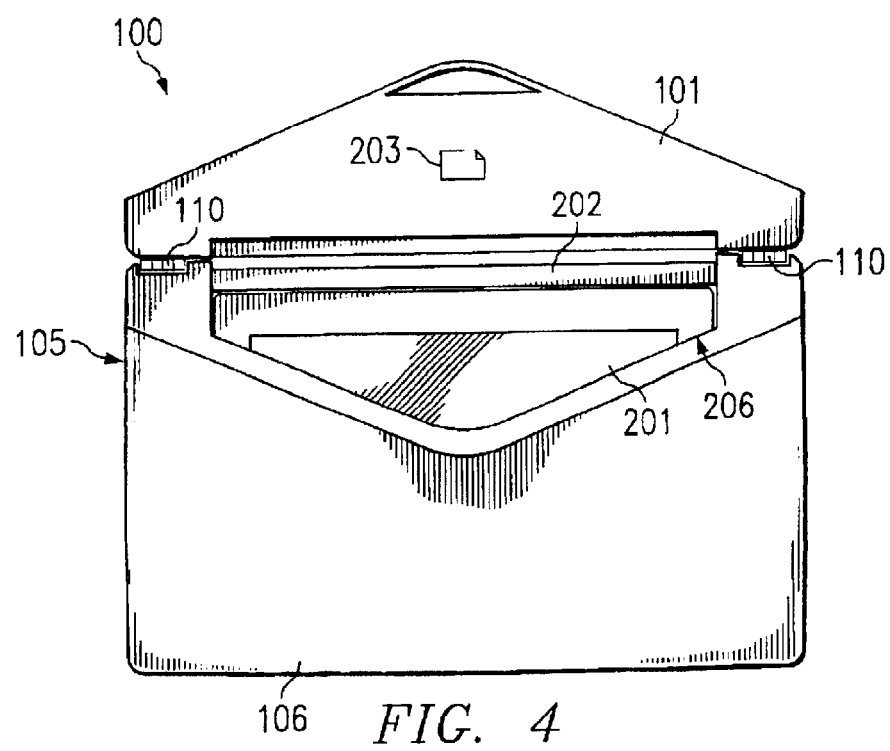
FIG. 4 is a top plan view of the scanner of FIG. 1 with the envelope flap open.
Figure 5:
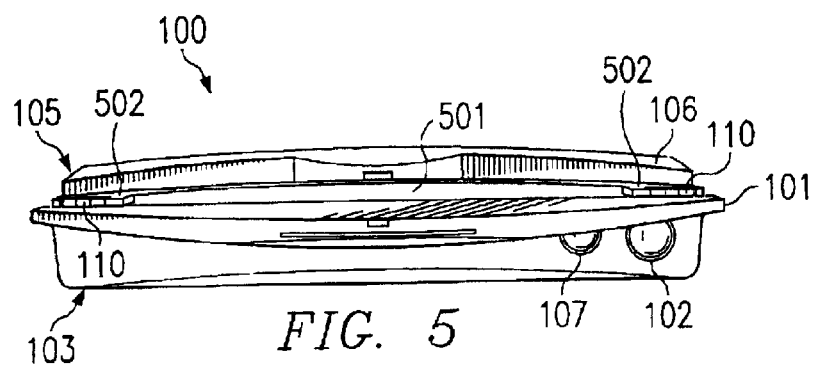
FIG. 5 is an end view of the scanner of FIG. 1 with the envelope flap open.

As best seen in FIG. 5, when triangular envelope flap portion 101 of document cover 105 is flipped open, media receptive slot 501 is revealed between cover base 106 and platen 201. Thus open, the flap also reveals generally triangular opening 206, best seen in FIGS. 2, 4 and 6, defined by flap 101 and cover base 106. Guides 502, best seen in FIGS. 5 and 6, under document cover 105 facilitate more precise, automatic locating of the photograph or other planar media to be scanned allowing the user to insert the media through slot 501 and slide it into position more easily. The edges of the media slide along one or both guides 502 and the media comes to rest against stop 601, similar to sliding a document into an envelope. Guides 502 and stop 601 automatically locate the media in the correct position on platen 201 for scanning. Preferably, flap 101 and document cover base 106 employ snap closure projection 204 and snap enclosure indent 205 to snap fittingly secure flap 101 to document cover base 106 to facilitate use of the document cover 105 as a unit.

Figure 2:
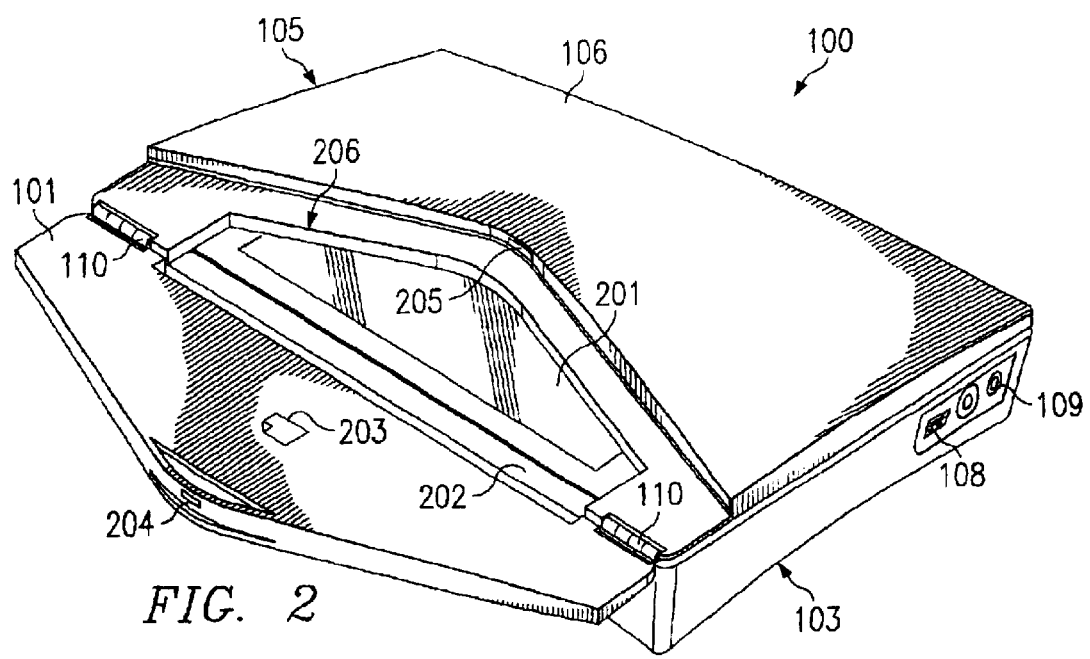
FIG. 2 is a perspective view of the scanner of FIG. 1 with the envelope flap open.
Figure 3:
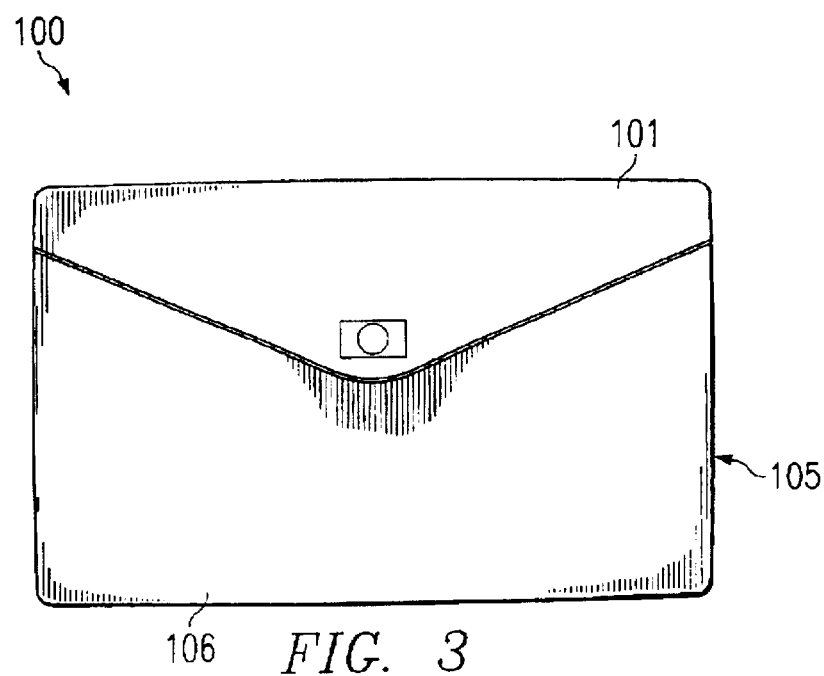
FIG. 3 is a top plan view of the scanner of FIG. 1.
Figure 6:
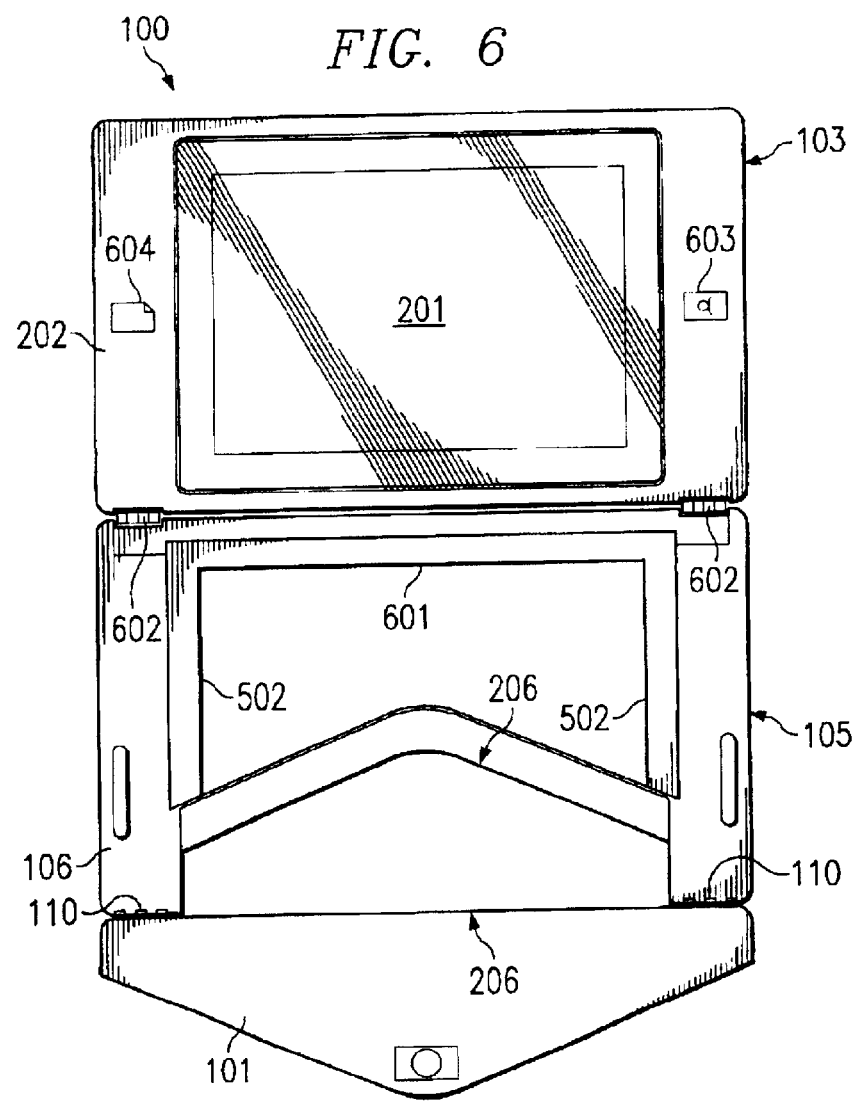
FIG. 6 is a top plan view of the scanner of FIG. 1 with the document cover open, and the envelope flap open for purposes of illustration.

As seen in FIGS. 2 and 4, face down icon 203 reminds a user to insert media into slot 501 face down for scanning. Preferably, icon 203, or alternatively a second icon, indicates top and bottom of the media. As illustrated in FIG. 6, directional icons 603 and 604 disposed about the periphery of platen 201 on upper side 202 of housing 103 facilitate proper orientation of the media to be scanned when document cover 105 is opened to scan oversized items.

Returning to FIG. 1, an input/output port 108, such as a universal serial bus (USB) connector is preferably disposed on a side of the housing 101 for connecting envelope scanner 100 to a PC, set top box or similar processing device. Preferably, port 108 offers both I/O capability and power to envelope scanner 100. Alternatively, power input port 109 receives a power supply cord from a transformer or similar power source.

To use the envelope scanner, the user preferably opens flap 101 and slips the media to be scanned inside envelope scanner 100, through slot 501, face down, snaps flap 101 closed and presses send button 102. As will be appreciated by one skilled in the art, flap 101 need not necessarily be snapped closed, but may rather rest closed in place during scanning. Depending on the software employed by the attached computer, set top box or other processing device and its set-up, a digital image of the media is immediately sent to a predetermined recipient, or a software program is called up on the PC or similar device where the user enters the destination and adds any desired text.

Preferably, the envelope scanner also offers a rotate button 107. If the orientation of the media or photograph is portrait rather than landscape, the rotate button preferably allows a user to rotate the scanned image ninety degrees, so that the image will appear on the receiver's computer screen or television in the proper orientation. If the image is not in the correct orientation following use of the rotate button, then the user can continue to click the rotate control button, multiple times, until the image is in the correct orientation.

What is claimed is:

1. A scanner comprising:
    a platen supported by a housing, said platen adapted to abut a media to be scanned; and
    a document cover adapted to sandwich said media against said platen, said document cover hinged to said housing by at least one first hinge, said document cover comprising:
        a base portion having a closed position and at lest one open position; and
        a flap portion independently hinged to said base portion by at least one second hinge, said flap portion adapted to open to enable insertion of said media onto said platen, between said base portion and said platen, while said base portion is in said closed position.

2. A scanner comprising:
    a platen supported by a housing, said platen adapted to abut a media to be scanned; and
    a document cover adapted to sandwich said media against said platen, said document cover hinged to said housing by at least one first hinge, said document cover comprising:
        a base portion having a closed position and at least one open position;
        a flap portion independently hinged to said base portion by at least one second hinge, said flap portion adapted to open to enable insertion of said media onto said platen while said base portion is in said closed position; and
        a media receptive slot defined between said document cover base portion and said housing, wherein said slot is revealed when said flap portion is opened.

3. The scanner of claim 2 wherein said document cover base portion further comprises at least one guide that directs said media, inserted through said slot, onto said platen.

4. The scanner of claim 3 wherein said guides align said media on said platen in a proper position for scanning.

5. The scanner of claim 3 wherein said document cover base portion further comprises at least one stop disposed generally perpendicular to said guides, said stop blocking insertion of said media in a proper position for scanning of said media.

6. The scanner of claim 3 wherein two of said guides are disposed spaced apart and generally parallel.

7. The scanner of claim 3 wherein said guides abut an upper surface of said housing, spacing said document cover apart from said platen defining said slot.

8. The scanner of claim 3 wherein two of said guides define sides of said slot.

9. A scanner comprising:
    a platen supported by a housing, said platen adapted to abut a media to be scanned; and
    a document cover adapted to sandwich said media against said platen, said document cover hinged to said housing by at least one first hinge, said document cover comprising:
        a base portion having a closed position and at least one open position;
        a flap portion independently hinged to said base portion by at least one second hinge, said flap portion adapted to open to enable insertion of said media onto said platen while said base portion is in said closed position, said flap portion further comprising a first snap closure portion and said document cover base portion further comprising a second snap closure portion, said snap closure portions cooperatively retaining said flap in a closed position, facilitating use of said document cover as a unit.

10. The scanner of claim 1 wherein said flap portion is generally triangular.

11. The scanner of claim 1 further comprising directional icons indicating correct orientation of said media for scanning.

12. A method for scanning a media, said method comprising the steps of:

providing a flatbed scanner comprising a platen supported by a housing;

mounting a hinged document cover selectively disposed over said platen to said housing, said cover comprising a base portion hinged to said housing and a flap portion independently hinged to said base portion;

opening said flap to reveal a media receptive slot defined between said base portion of said cover and said housing;

inserting a media to be scanned into said slot onto said platen;

closing said flap; and initiating an electronic image scan of said media.

13. The method of claim 12 wherein said inserting step further comprises the step of:

guiding said media onto said platen, aligned for scanning.

14. The method of claim 13 wherein said guiding step further comprises the step of:

stopping insertion of said media on said platen, aligned for scanning.

15. The method of claim 12 wherein said opening step includes snapping said flap open.

16. The method of claim 12 wherein said closing step includes snapping said flap closed.

17. The method of claim 12 wherein said mounting step includes removably hinging said document cover to said housing.

18. A scanner comprising:

means for scanning an electronic image of a media;

means for selectively covering media disposed on a platen of said scanner;

means for removably hinging said means for covering from said scanner;

means for defining a media receptive slot between said means for covering and said platen; and means for revealing said slot, said means for revealing independently hinged to said means for covering.

19. The scanner of claim 18 further comprising means for guiding said media inserted into said slot into proper alignment on said platen for scanning.

20. The scanner of claim 18 further comprising means for stopping insertion of said media on said platen, aligned for scanning.

21. The scanner of claim 18 further comprising means for snap closing said means for revealing to said means for covering prior to scanning of said media.

* * * * *

UNITED STATES PATENT AND TRADEMARK OFFICE
CERTIFICATE OF CORRECTION

| | | |
|---|---|---|
| PATENT NO. | : 6,947,185 B2 | Page 1 of 1 |
| APPLICATION NO. | : 09/935113 | |
| DATED | : September 20, 2005 | |
| INVENTOR(S) | : Modest Khovaylo et al. | |

It is certified that error appears in the above-identified patent and that said Letters Patent is hereby corrected as shown below:

In column 1, line 5, above "BACKGROUND" insert -- TECHNICAL FIELD
The present invention generally relates to desktop scanners and specifically to a scanner having a document cover with a flat door hinged thereto. --.

In column 4, line 9, in Claim 1, delete "lest" and insert -- least --, therefor.

Signed and Sealed this

Sixteenth Day of June, 2009

JOHN DOLL
*Acting Director of the United States Patent and Trademark Office*